United States Patent
Nagata et al.

(10) Patent No.: US 8,675,619 B2
(45) Date of Patent: Mar. 18, 2014

(54) WIRELESS AD HOC COMMUNICATION SYSTEM

(75) Inventors: Nami Nagata, Kawasaki (JP); Kazuo Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1229 days.

(21) Appl. No.: 12/398,771

(22) Filed: Mar. 5, 2009

(65) Prior Publication Data

US 2009/0323654 A1   Dec. 31, 2009

(30) Foreign Application Priority Data

Jun. 30, 2008   (JP) .................. 2008-171134

(51) Int. Cl.
| | |
|---|---|
| H04W 4/00 | (2009.01) |
| H04W 84/12 | (2009.01) |
| H04W 84/18 | (2009.01) |

(52) U.S. Cl.
CPC .............. H04W 84/12 (2013.01); H04W 84/18 (2013.01)
USPC ....................................... 370/338

(58) Field of Classification Search
USPC ....................................... 370/338
See application file for complete search history.

(56) References Cited

U.S. PATENT DOCUMENTS

| | | | |
|---|---|---|---|
| 2002/0027957 A1* | 3/2002 | Paulraj et al. | 375/267 |
| 2004/0163008 A1* | 8/2004 | Kim | 714/4 |
| 2005/0003763 A1* | 1/2005 | Lastinger et al. | 455/63.1 |
| 2006/0215611 A1 | 9/2006 | Nakagawa et al. | |
| 2008/0132260 A1 | 6/2008 | Lastinger et al. | |
| 2008/0132261 A1 | 6/2008 | Lastinger et al. | |
| 2008/0137616 A1 | 6/2008 | Lastinger et al. | |
| 2008/0232389 A1* | 9/2008 | Wu et al. | 370/436 |
| 2008/0274748 A1 | 11/2008 | Lastinger et al. | |

FOREIGN PATENT DOCUMENTS

| | | |
|---|---|---|
| JP | 2004-523942 | 8/2004 |
| JP | 2005-101716 A | 4/2005 |
| JP | A 2005-303828 | 10/2005 |
| JP | 2006-311409 | 11/2006 |

OTHER PUBLICATIONS

Tseng et al.; "An architecture for power-saving communications in a wireless mobile ad hoc network based on location information;" Microprocessors and Microsystems, IPC Business Press Ltd., London, GB, vol. 28, No. 8; Oct. 4, 2004; pp. 457-465.

(Continued)

*Primary Examiner* — Jason Mattis
*Assistant Examiner* — Stephen J Clawson
(74) *Attorney, Agent, or Firm* — Fujitsu Patent Center (57) ABSTRACT

A communication terminal performs wireless ad hoc communication with another terminal via a first wireless interface dedicated to reception and a second wireless interface for both transmission and reception. The terminal executes defining a communication area to be divided into cells of first polygonal shapes and each of the cells to be divided into a plurality of sub-cells of second polygonal shapes different from the first polygonal shapes; allocating, so as to prevent adjacent cells from belonging to a set of two identical wireless channels, a first wireless channel and a second wireless channel as the set of wireless channels to the cells; and setting the first wireless channel and the second wireless channel so that the same transmission channel is set for sub-cells brought into contact between the adjacent cells while different transmission channels are set for adjacent sub-cells in an own cell where an own terminal is present.

6 Claims, 12 Drawing Sheets

(56) References Cited

OTHER PUBLICATIONS

R. Cunningham et al.; "Time bounded medium access control for ad hoc networks;" ACM, 2 Penn Plaza, Suite 701, New York; Oct. 31, 2002; pp. 1-8.

Zhang et al.; "A new multi-channel MAC protocol for ad hoc networks based on two-phase coding with power control;" Information, Communications and Signal Processing, 2003 and Fourth PAC IFIC RIM Conf. on Multimedia, Proceedings of the 2003 Joint Conf. of the Fourth International Conference on Singapore; Dec. 15-18, 2003; Piscataway, NJ, IEEE vol. 2, Dec. 15, 2003; pp. 1091-1095.

Japanese Office Action mailed Nov. 27, 2012, in connection with JP Patent Application No. 2008-171134, with English-language translation.

* cited by examiner

8 CELL INFORMATION STORAGE UNIT

| | REFERENCE POINT | ALLOCATED CHANNEL | | |
|---|---|---|---|---|
| | | 1st | 2nd | CHANNEL GROUP |
| G0 | (x0, y0) | Ach | Bch | 1 |
| G1 | (x1, y1) | Cch | Ach | 2 |
| G2 | (x2, y2) | Bch | Cch | 3 |
| G3 | (x3, y3) | Cch | Ach | 2 |
| G4 | (x4, y4) | Bch | Cch | 3 |
| G5 | (x5, y5) | Cch | Ach | 2 |
| G6 | (x6, y6) | Bch | Cch | 3 |

WIRELESS AD HOC COMMUNICATION SYSTEM

CROSS-REFERENCE TO RELATED APPLICATION

The disclosure of Japanese Patent Application No. JP 2008-171134 filed on Jun. 30, 2008 including the specification, claims, drawings and abstract is incorporated herein by reference in its entirety.

FIELD

The disclosures made herein relate to a wireless channel allocation technology in a wireless ad hoc communication system.

BACKGROUND

In the wireless ad hoc communication system, it is necessary to enable a plurality of wireless terminals (may simply be referred to as terminals) present in a communication area to communicate with one another. Hence, the terminals are directly interconnected to communicate with one another in an ad hoc mode of a wireless local area network (LAN), or the directly interconnected terminals relay other terminals' signals (packets) to communicate with one another. Thus, used frequencies are often similar among the terminals. However, a capacity (bandwidth) for one radio frequency channel (may simply be referred to as channel) is limited. Thus, when the number of simultaneously operated peripheral terminals increases, a capacity becomes short, causing a transmission delay or a signal collision. In consequence, performance is lowered.

In a mobile communication system, when all base stations use the same frequency, there arise problems that not only a capacity for each channel becomes short but also a radio interference occurs. Thus, a communication area is generally divided into zones (cells) of certain sizes or shapes, and channels are arranged to prevent interferences between adjacent cells (e.g., refer to "Basics of Mobile Communications" by the Institute of Electronics and Communication Engineers, under the editorship of Okumura and Shinji).

Figure 1:
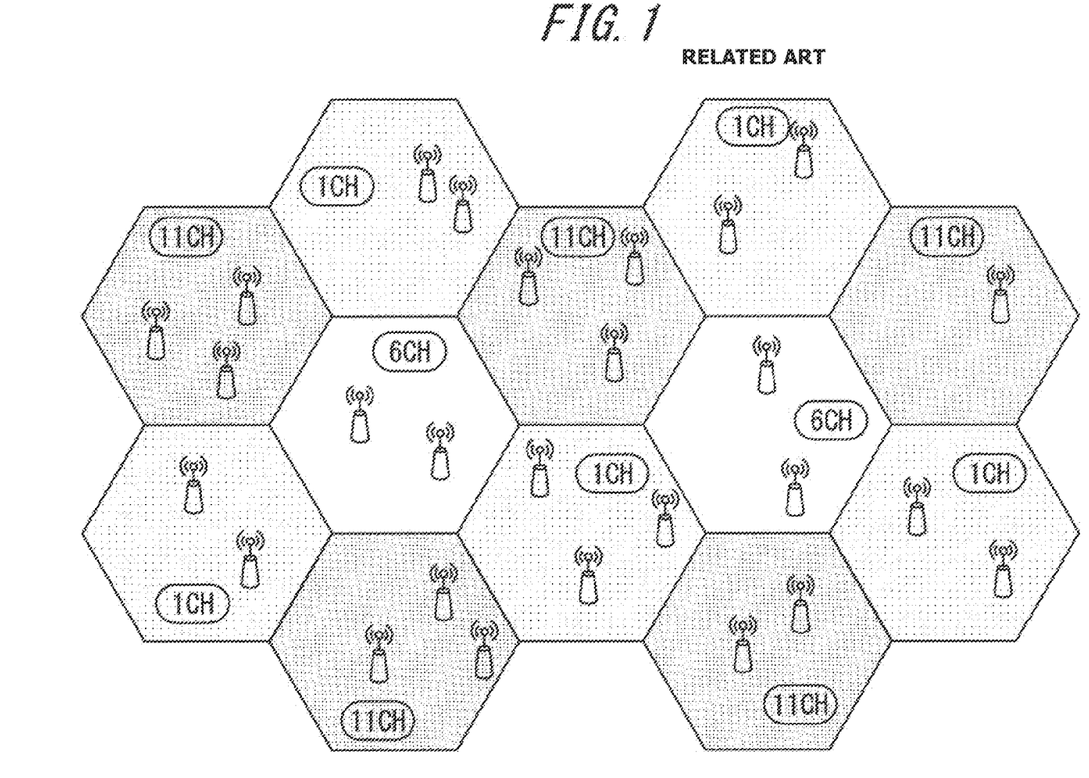
FIG. 1 is a diagram illustrating a channel arrangement example of a wireless LAN.

Thus, as illustrated in FIG. 1, a communication area in the wireless ad hoc communication system is divided into a plurality of cells, and a channel is allocated to each cell. In this case, while terminals of the cells using the same channel can communicate with each other, terminal shaving different channels allocated thereto cannot communicate with each other even when the terminals are located in positions near to each other.

To solve this problem, for example, each terminal may include two wireless interfaces, and one wireless interface may use an allocated channel of each cell while a fourth channel for relay other than three channels allocated for each cell may be allocated to the other wireless interface.

However, in the case of a wireless LAN (IEEE802.11b/11g) of a bandwidth of 2.4 GHz, only three channels (e.g., radio frequency channels 1 ch, 6 ch, and 11 ch) can be used without any mutual interferences, and no relay channel can be allocated.

Even when a relay channel can be allocated as in the case of a wireless LAN (IEEE802.11a) of a bandwidth of 5 GHz, whether a next transfer destination of a transmitted packet is the same cell or a different cell has to be judged, necessitating cumbersome processing associated with ad hoc routing.

Additionally, in the wireless ad hoc communication system, no wireless station (e.g., equivalent to a base station of a mobile communication system) that has a management function of asking for information of cells and channel arrangement is included. Thus, each terminal has to hold such information. When a terminal is mobile, management information of all communication areas to which the terminal is likely to move has to be provided, increasing the amount of information to be held. Thus, this case is not realistic.

The following are related arts to the invention.

[Patent document 1] Japanese Patent Laid-Open Publication No. JP 2005-101716

[Patent document 2] Japanese Patent Laid-Open Publication No. JP 2005-303828

SUMMARY

According to an aspect of the disclosures made herein, a wireless ad hoc communication terminal that performs wireless ad hoc communication with another terminal via a first wireless interface dedicated to reception and a second wireless interface for both transmission and reception includes a defining unit that defines a communication area to be divided into cells of first polygonal shapes and each of the cells to be divided into a plurality of sub-cells of second polygonal shapes different from the first polygonal shapes; an allocating unit that allocates, so as to prevent adjacent cells from belonging to a set of two identical wireless channels, a first wireless channel and a second wireless channel as the set of wireless channels to the cells; and a setting unit that sets the first wireless channel and the second wireless channel so that the same transmission channel is set for sub-cells brought into contact between the adjacent cells while different transmission channels are set for adjacent sub-cells in an own cell where an own terminal is present.

The objects and advantages of the invention will be realized and attained by means of the elements and combinations particularly pointed out in the claims.

DESCRIPTION OF EMBODIMENTS

The embodiment of the disclosures made herein will be described below referring to the drawings in detail. The drawings illustrate a preferred embodiment. It should be understood, however, that the embodiment can be implemented by many different embodiments, and is not limited to the embodiment described herein.

[Example of Cell Division and Channel Allocation]

First, an example of cell division and channel allocation applied to a wireless ad hoc communication system of an embodiment is described.

Figure 2:
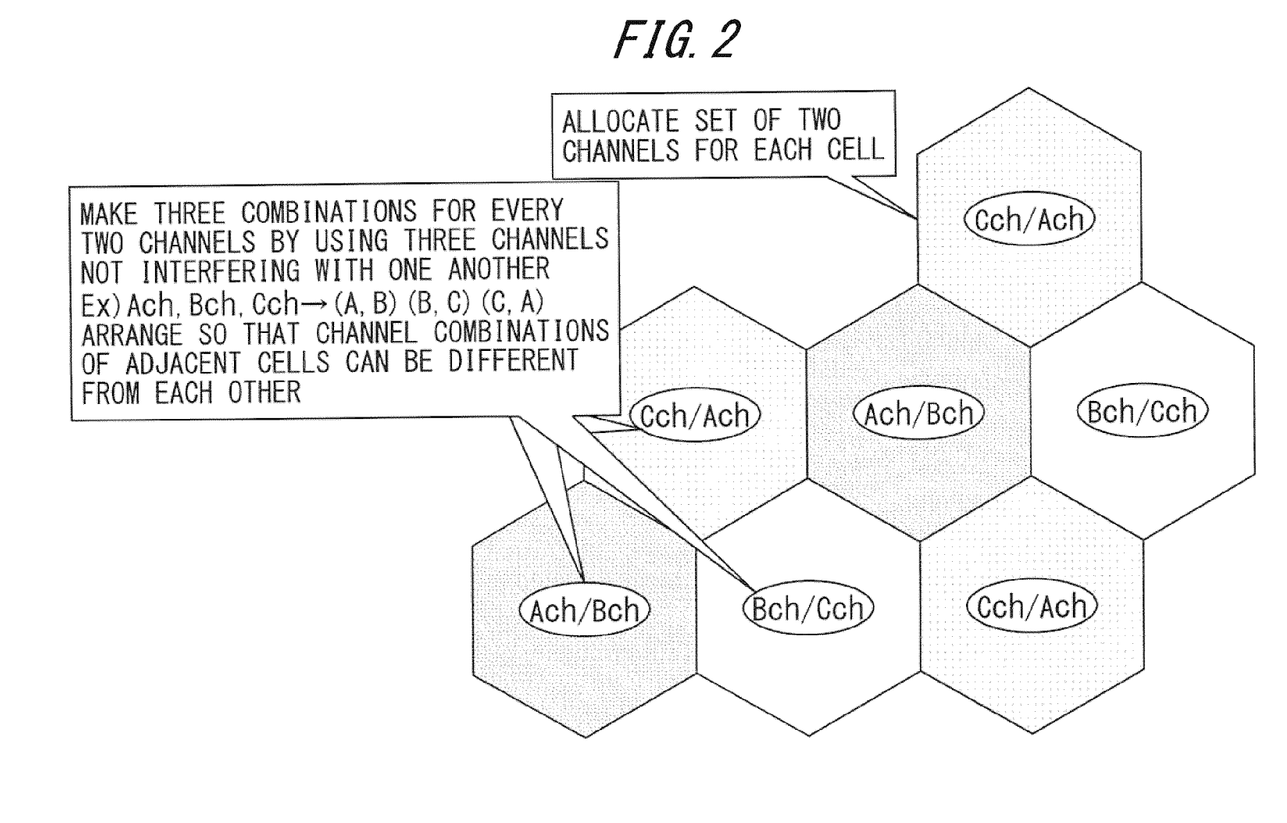
FIG. 2 is a diagram illustrating an example of cell division and channel allocation in a wireless ad hoc communication system according to an embodiment.
Figure 3:
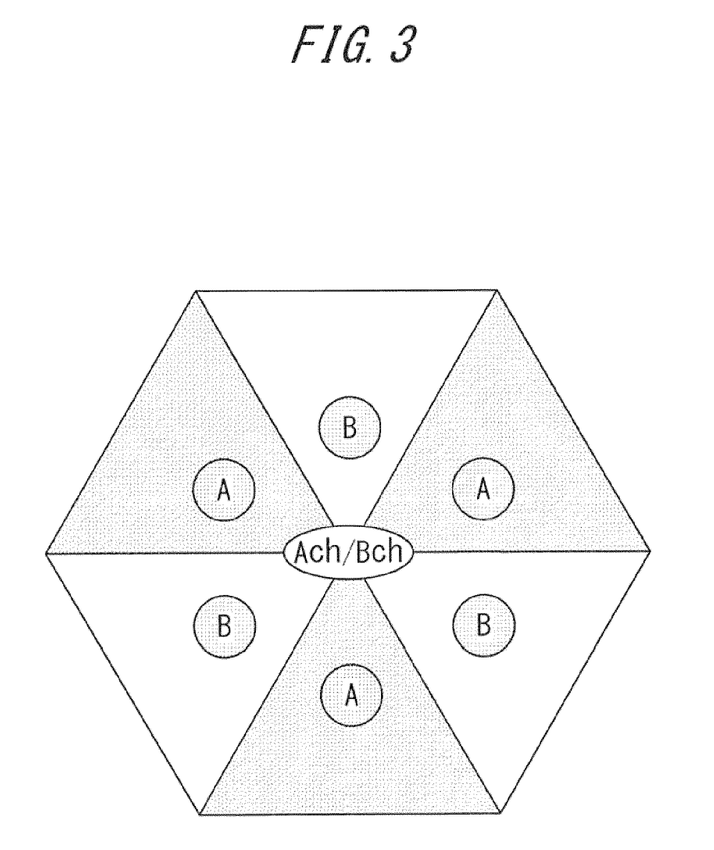
FIG. 3 is a diagram illustrating a transmission channel allocation example for each sub-cell according to the embodiment.

In this wireless ad hoc communication system, as illustrated in FIG. 2, for shapes of cells into which a communication area is divided, hexagons that can be repeatedly arranged in such a manner as to prevent three wireless channels (radio frequency channels) from being adjacent to one another are employed. As illustrated in FIG. 3, each hexagonal cell is further divided into six triangles divided by diagonal lines passing through a center thereof, and these triangles are defined as sub-cells.

Each wireless terminal constituting the wireless ad hoc communication system includes two wireless interfaces for transmission and reception. Two sets of channels are accordingly allocated to each cell. When channels to be used are three types, Ach, Bch, and Cch, in order to enable communication between cells, combinations of channels to be allocated to cells are three, a first group: Ach and Bch, a second group: Bch and Cch, and a third group: Cch and Ach. The groups of the three sets of channels are arranged in each cell so as not to be adjacent to one another.

In each cell, transmission channels are fixed and allocated for every six sub-cells. For transmission channels for each sub-cell, for example, two channels Ach and Bch are alternately allocated as illustrated in FIG. 3. Moreover, cells are arranged so that transmission channels of adjacent two sub-cells are the same between different cells. As a result of such cell/sub-cell division and channel allocation, as illustrated in FIG. 4, a communication area of the wireless ad hoc communication system can be defined.

In this case, two reception channels are usable while the transmission channels are fixed in an own cell. Thus, in the example illustrated in FIG. 3, a signal (packet) transmitted from the sub-cell of Ach can be received even in an area where transmission channels located adjacently on both sides are fixed to Bch. This is because the signal can be received by both channels Ach and Bch allocated to the two wireless interfaces. The same applies to a case where a signal is transmitted from the sub-cell of Bch. Thus, mutual communication is allowed.

Figure 4:
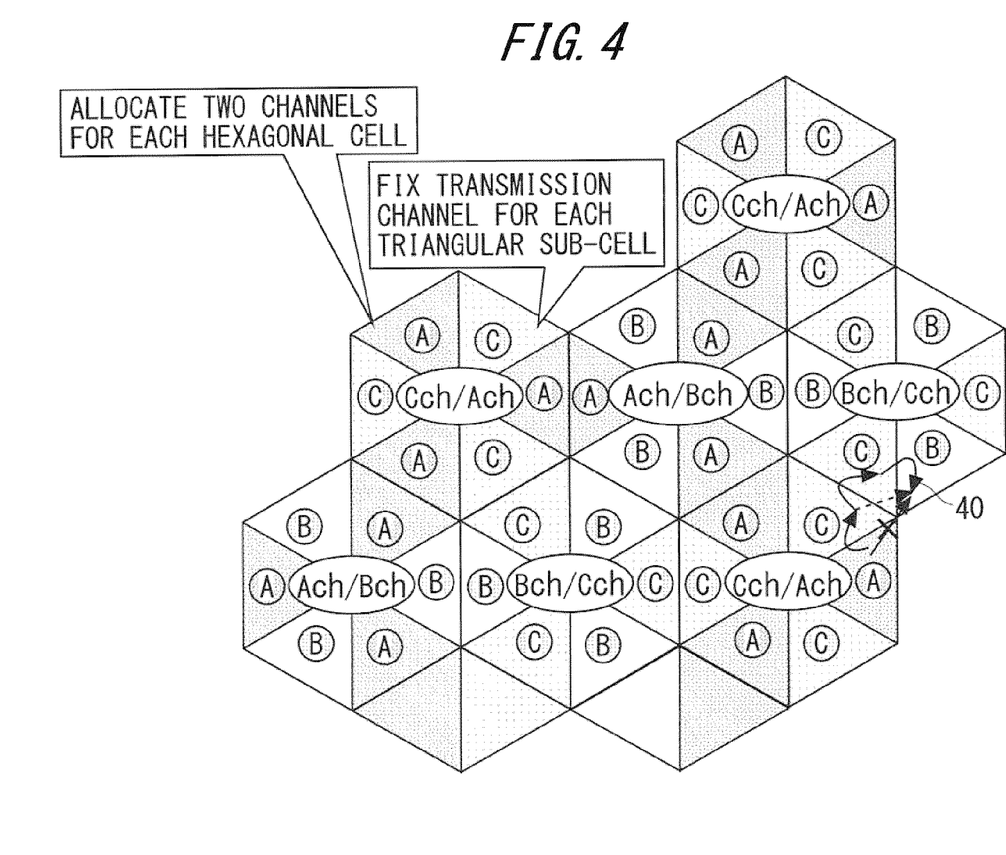
FIG. 4 is a diagram illustrating an example of cell/sub-cell division and transmission channel allocation according to the embodiment.

As illustrated in FIG. 4, mutual communication is allowed even between different cells since transmission channels of adjacent two sub-cells are the same. When transmission channels of adjacent two sub-cells are different between different cells, direct communication cannot be carried out. Thus, by passing the adjacent sub-cells, the cells are interconnected by a plurality of hops to communicate with each other (e.g., refer to 40 of FIG. 4.).

In order to perform such cell/sub-cell channel allocation in each terminal, information on a position of an own terminal, a position of a center point (referred to as reference point) of a cell to which the own terminal belongs (in which the own terminal exists), and an allocated channel is only necessary. This information is held in only a terminal which is a starting point, and distributed according to a request from a newly added peripheral terminal.

The information held in the terminal includes information of the cell to which the own terminal belongs and is information of the six cells located around the own cell. Thus, when a request comes from a directly connectable peripheral terminal, information containing the information of a cell to which the requester terminal belongs can be supplied.

The supplied cell information is converted into information of seven cells located around the cell to which the own terminal belongs to be held, and supplied when a request comes from the newly added peripheral terminal. Thus, the cell information is updated after each propagation, and hence information of the seven cells serving as a reference only needs to be supplied to the terminal serving as a starting point, whereby the amounts of information held by the terminals may all be equal.

[Configuration of Wireless Terminal]

Figure 5:
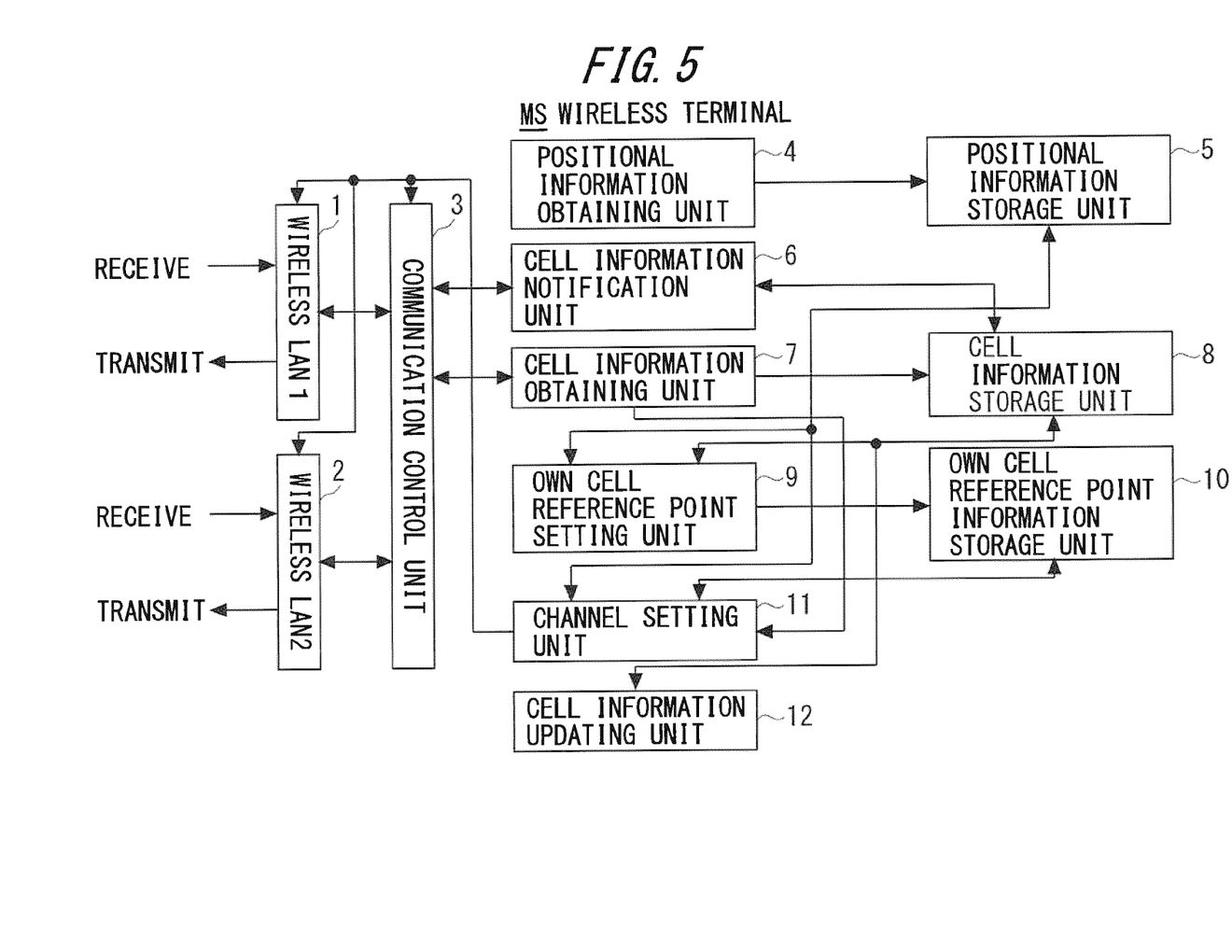
FIG. 5 is a block diagram illustrating a configuration of a wireless terminal according to the embodiment.

Referring to FIG. 5 which illustrates a configuration of a wireless terminal (wireless ad hoc communication terminal) MS constituting the wireless ad hoc communication system of the embodiment, a wireless LAN (1)1 and a wireless LAN (2)2 are a first wireless interface dedicated to reception and a second wireless interface for transmission and reception, and are LAN cards for converting a packet received from a communication control unit 3 for transmission, and receiving a packet from another terminal. The communication control unit 3 routes a packet received from an upper layer to the wireless LAN (1)1 or (2)2 based on routing information. The communication control unit 3 transfers the packet received by the wireless LAN (1)1 or (2)2 to the upper layer.

A positional information obtaining unit 4 is an interface for performing positioning or receiving a terminal position from the outside based on information from a global positioning system (GPS). A positional information storage unit 5 stores the positional information obtained by the positional information obtaining unit 4. A cell information notification unit 6 transmits cell information read from a cell information storage unit 8 to another terminal via the communication control unit 3 in response to a cell information request received from the another terminal.

When setting a new channel, a cell information obtaining unit 7 broadcasts a cell information request to a peripheral terminal to wait for a response from the peripheral terminal. The cell information obtaining unit 7 repeatedly executes broadcasting while switching channels until this response is obtained.

The cell information storage unit 8 stores the cell information obtained by the cell information obtaining unit 7. The cell information storage unit 8 stores cell information updated by a cell information updating unit 12. An own cell reference point setting unit 9 stores, among pieces of cell information read from the cell information storage unit 8, cell information having a reference point where a position of its own terminal read from the positional information storage unit 5 is closest as own cell information in an own cell reference point information storage unit 10.

The own cell reference point information storage unit 10 stores own cell reference point information (reference point coordinate and allocated channel). A channel setting unit 11 sets channels to be used by the wireless LAN (1)1 and the wireless LAN (2)2 based on the allocated channels read from the own cell reference point information storage unit 10. The channel setting unit 11 estimates, based on the reference point coordinate read from the own cell reference point information storage unit 10 and the position of the own cell read from the positional information storage unit 5, sub-cells of the own terminal to decide a transmission channel. The cell information updating unit 12 updates the cell information obtained by the cell information obtaining unit 7 and then temporarily stored in the cell information storage unit 8, and stores the updated cell information in the cell information storage unit 8.

[Processing in Wireless Terminal]

Next, processing executed in the wireless terminal MS employing a configuration illustrated in FIG. 5 is described referring to the related drawings.

(1) In each of a plurality of wireless terminals MS constituting the wireless ad hoc communication system, a communication area is defined so as to be divided into a plurality of hexagonal cells. A size (radius) of each cell is decided based on a terminal density, a required bandwidth, or transmission power. Three sets each including two channels selected among three channels that do not interfere with one another are allocated to each cell. For example, when the three channels are Ach, Bch, and Cch, sets of the three channels are a first group: Ach and Bch, a second group: Bch and Cch, and a third group: Cch and Ach. These are referred to as channel groups.

Figure 6:
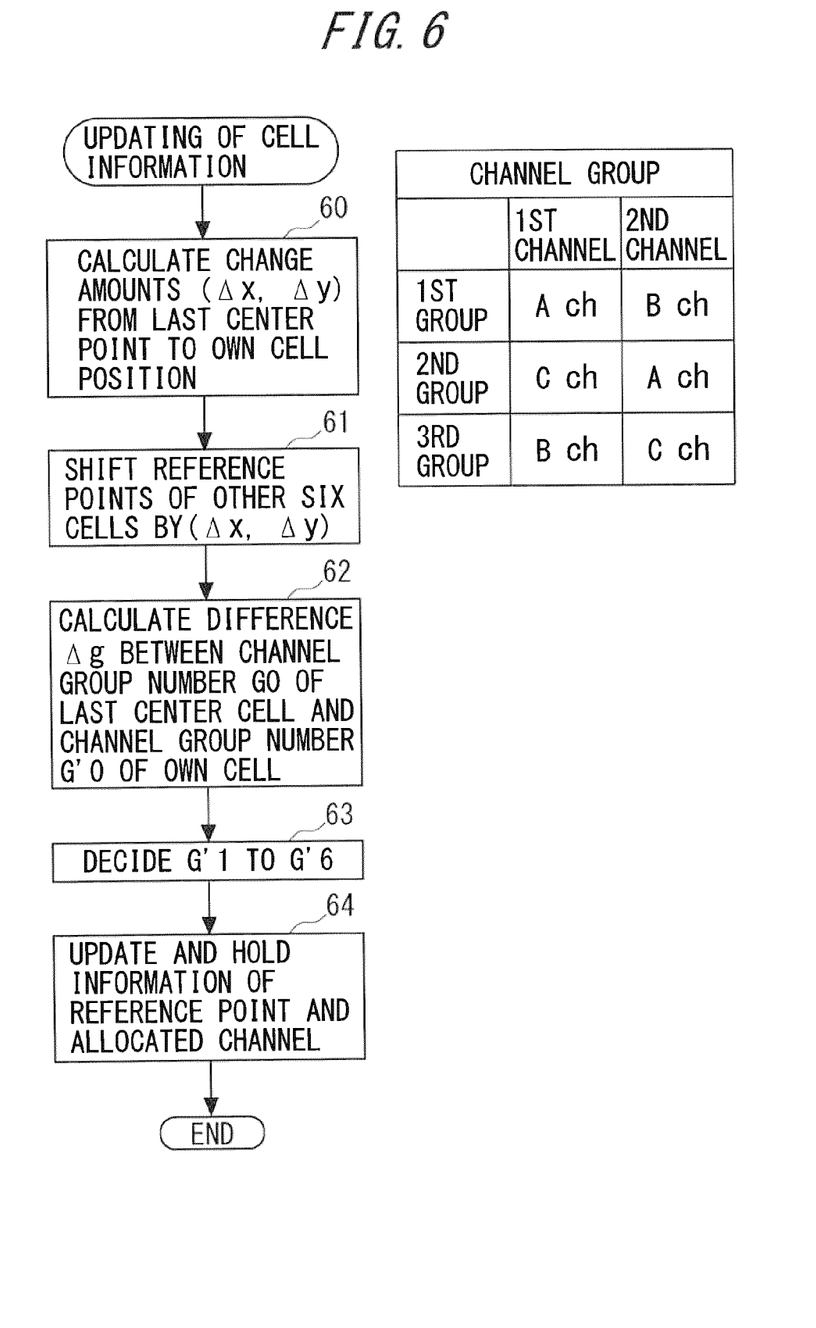
FIG. 6 is a diagram illustrating a procedure of updating cell information according to the embodiment.

Channels within the channel group are, as illustrated in a table of FIG. 6, classified into first and second channels. The three sets of channel groups are arranged so as to prevent adjacent cells from belonging to the same set (refer to FIG. 2).

Each cell is defined so as to be divided into six triangular sub-cells, and a transmission channel is decided for each sub-cell. For example, as illustrated in FIG. 3, the cell is divided into six triangular sub-cells, and the transmission channel of the sub-cells are arranged in order of a first channel Ach and a second channel Bch clockwise from the sub-cell on the right upper side. The same transmission channel is allocated to sub-cells between adjacent cells.

FIG. 4 illustrates an example of cell/sub-cell division and channel group/transmission channel arrangement executed in view of the above. In this case, even if transmission channels are different in the same cell, data can be received by one of the two allocated channels, and thus no problem occurs in mutual communication. Sub-cells between different adjacent cells use the same transmission channel, and thus can communicate with each other.

To realize the processing (1), the wireless terminal MS carries out the following processings (2) to (5).

(2) Channel Setting of Own Terminal: To set a channel for an own terminal, a position of a reference point and an allocated channel of a cell to which the own terminal belongs are used. To guarantee mutual connection with another cell, in other words, to set the same transmission channel for sub-cells between adjacent cells, first and second channels have to be clearly designated beforehand as allocated channels.

Figure 7:
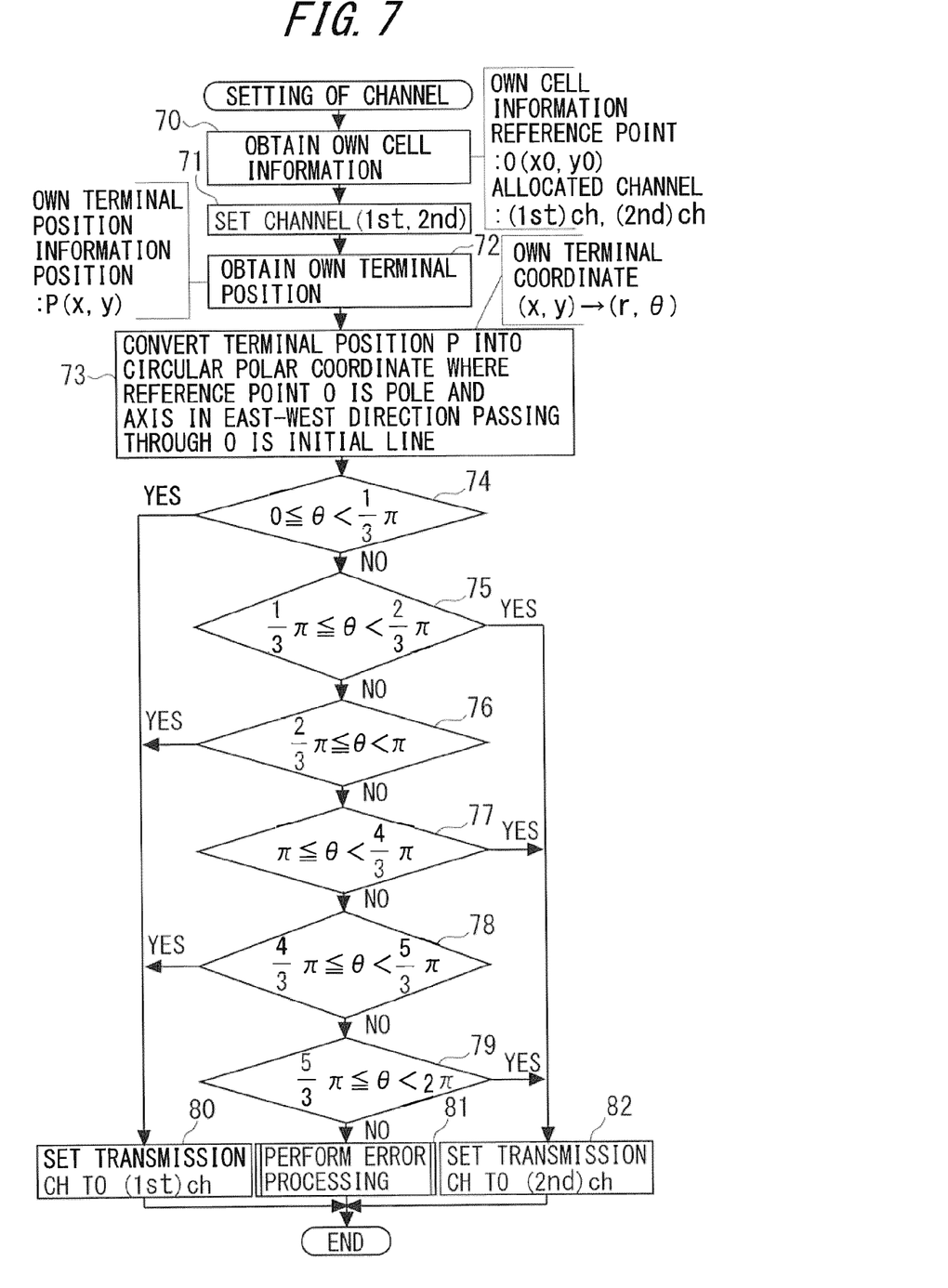
FIG. 7 is a diagram illustrating a procedure of allocating channels according to the embodiment.

FIG. 7 illustrates an example of a transmission channel allocation procedure carried out by using pieces of information of a reference point and an allocated channel. First, the pieces of the information of reference point of an own cell and the allocated channel stored in the own terminal are read (70). Then, channels used for the two wireless interfaces are respectively set to be first and second channels (71).

Figure 8:
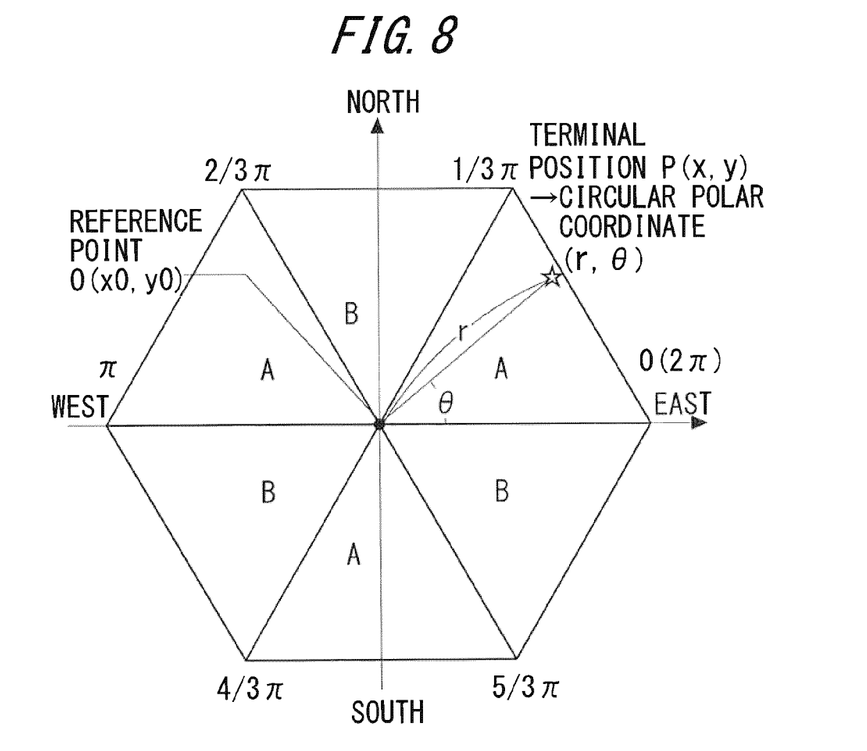
FIG. 8 is a diagram illustrating a circular polar coordinate conversion example of a terminal position according to the embodiment.

Subsequently, terminal position information stored in the own terminal is read (72). A position P(x, y) of the terminal is converted into a circular polar coordinate (r, $\theta$) where a reference point O(x0, y0) is a pole and an east-west direction axis passing through the reference point O is an initial line (73). FIG. 8 illustrates an example of circular polar coordinate conversion. In this case, r denotes a distance from the reference point O, and $\theta$ denotes an angle with respect to the east-west direction axis. Transmission channels are allocated based on the angle $\theta$ with respect to the east-west direction axis. Steps 74 to 82 of FIG. 7 illustrate an example of an algorithm of transmission channel allocation. According to a result of the judgment in the algorithm, first and second channels are alternately arranged.

In other words, when a judgment result of any one of $0=<\theta<1/3\pi$, $2/3\pi=<\theta<\pi$, and $4/3\pi=<\theta<5/3\pi$ is positive (Yes) in Steps 74, 76, and 78, a first channel Ach is set as a transmission channel. When any one of judgment results of $1/3\pi=<\theta<2/3\pi$, $\pi=<\theta<4/3\pi$, and $5/3\pi=<\theta<2\pi$ is positive (Yes) in Steps 75, 77, and 79, a second channel Bch is set as a transmission channel. When judgment results of Steps 74 to 79 are all negative (No), error processing is carried out.

More specifically, in the wireless terminal MS illustrated in FIG. 5, the channel setting unit 11 reads pieces of information of the reference point of the own cell and the allocated channel stored in the own cell reference point information storage unit 10. The pieces of information stored in the own cell reference point information storage unit 10 are, among seven types of cell information G0 to G6 illustrated in FIG. 9, information of a coordinate of a reference point of a cell having a reference point closest from the own terminal and information of allocated channels (first and second channels).

Then, the channel setting unit 11 sets, based on the pieces of read information, channels used for the wireless LAN (1)1 and the wireless LAN (2)2 compatible with the two wireless interfaces. Subsequently, the channel setting unit 11 converts the position of the own terminal read from the positional information storage unit 5 into a circular polar coordinate, and then estimates a sub-cell where the own terminal is positioned, thereby deciding transmission channels.

Figure 10:
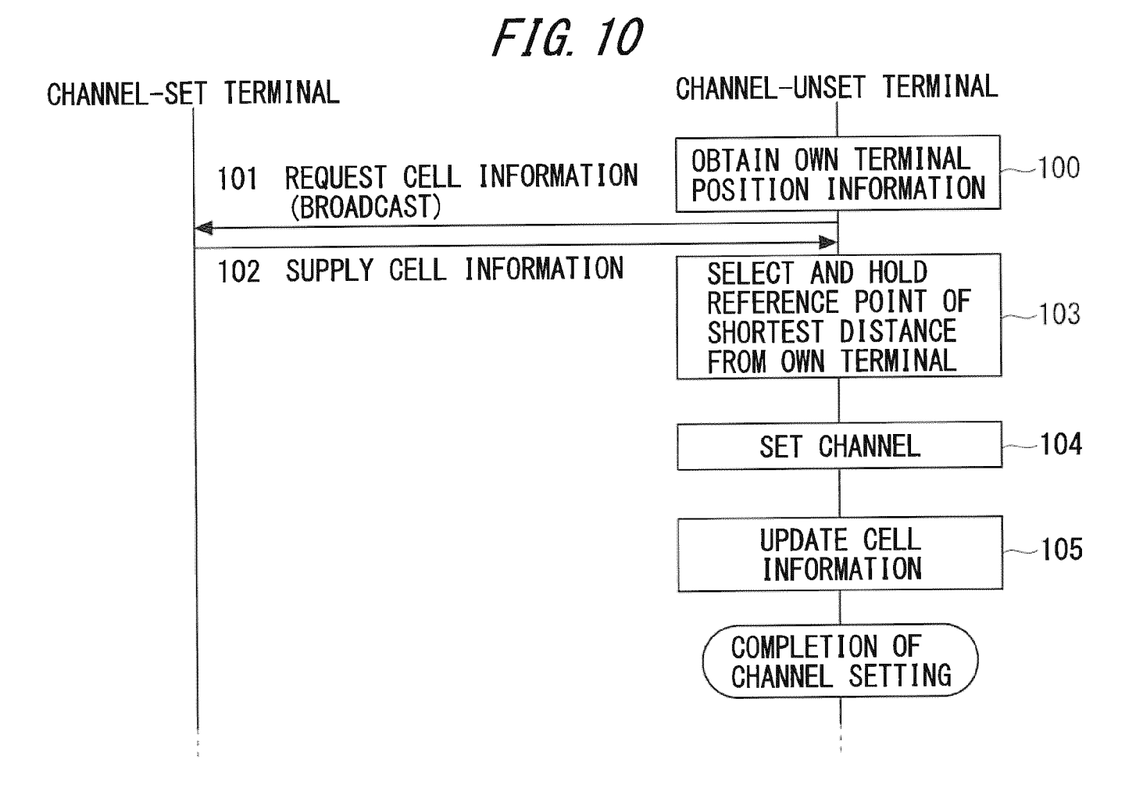
FIG. 10 is a diagram illustrating a cell information transmission procedure according to the embodiment.

(3) Obtaining of Cell Information and Storage of Own Cell Reference Point:

Information necessary for channel setting of a terminal is obtained from a peripheral terminal where a channel has been set. Specifically, as illustrated in FIG. 10, a terminal where a channel is not set first obtains positional information of an own terminal (100), and broadcasts a packet of a cell information request while changing a used channel (101). The cell information notification unit 6 and the cell information storage unit 8 of the terminal where the channel has been set and which has received the cell information request notify the terminal where a channel is not set of cell information stored in the own terminal (102).

The terminal where a channel is not set selectively stores (holds), based on the received cell information and the position of the own terminal, a reference point of a distance shortest from the own terminal, in other words, a reference point of an own cell (103). Based on the selected reference point of the own cell, the terminal where a channel is not set carries out channel setting according to the procedure of the processing (2) (104), and updates and stores the cell information (105). Thus, the channel setting is completed. Then, when receiving a cell information request from a peripheral terminal where a channel is not set, the terminal notifies the peripheral terminal of the updated cell information stored in the own terminal.

More specifically, in the wireless terminal MS, when a channel is not set, the cell information obtaining unit 7 first obtains cell information. In this case, when positional information is not obtained, the positional information obtaining unit 4 obtains positional information to store the obtained positional information in the positional information storage unit 5. The cell information obtaining unit 7 generates a cell information request packet to broadcast the generated packet to a peripheral terminal.

Transmission of the cell information request packet is periodically repeated until a response comes from the peripheral terminal. If no response comes for a fixed period, the cell information obtaining unit 7 instructs the channel setting unit 11 to switch a channel. After channel switching of the wireless LAN (1)1 or the wireless LAN (2)2 by the channel setting unit 11, the cell information obtaining unit 7 repeats the broadcasting again.

Figure 9:
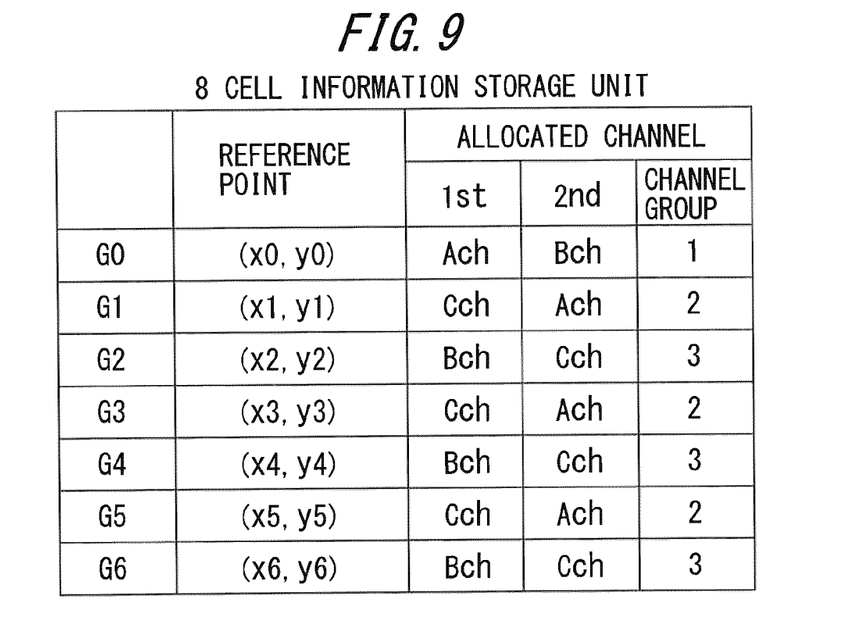
FIG. 9 is a diagram illustrating cell information according to the embodiment.

After having successfully received cell information based on a response from the peripheral terminal, the cell information obtaining unit 7 stores the received cell information in the cell information storage unit 8. The cell information to be stored in the cell information storage unit 8 is as illustrated in FIG. 9. The own cell reference point setting unit 9 judges, among the pieces of cell information stored in the cell information storage unit 8, a cell closest to the position of the own cell read from the positional information storage unit 5 as a cell to which the own terminal belongs, and stores this cell information in the own sell reference point information storage unit 10.

(4) Pieces of information necessary for channel setting of the two wireless interfaces and transmission channel setting in the wireless terminal MS are a reference point of the own cell and an allocated channel. If information to be supplied upon reception of a cell information request from another terminal is only information of the own cell, the terminal in the own cell can set a channel while a terminal belonging to an adjacent peripheral cell cannot set any channel.

Thus, each terminal holds at least pieces of information (reference point and allocated channel) of seven cells G0 to G6 including the own cell G0 together with its six peripheral cells G1 to G6 in the cell information storage unit 8, and the cell information notification unit 6 notifies another terminal of the information in response to a request. When a plurality of pieces of cell information are received in the procedure of the processing (3), cell information where a reference point of a shortest distance is present may be employed.

As illustrated in FIG. 9, the pieces of cell information in the cell information storage unit 8 include the information of the seven cells G0 to G6 including the own cell G0 and its six peripheral adjacent cells G1 to G6, and a reference point and an allocated channel are associated for each cell. The allocated channel information includes a first channel, a second channel, and a channel group. The reference point information is information of the above-mentioned circular polar coordinate or longitude/latitude information.

Figure 11:
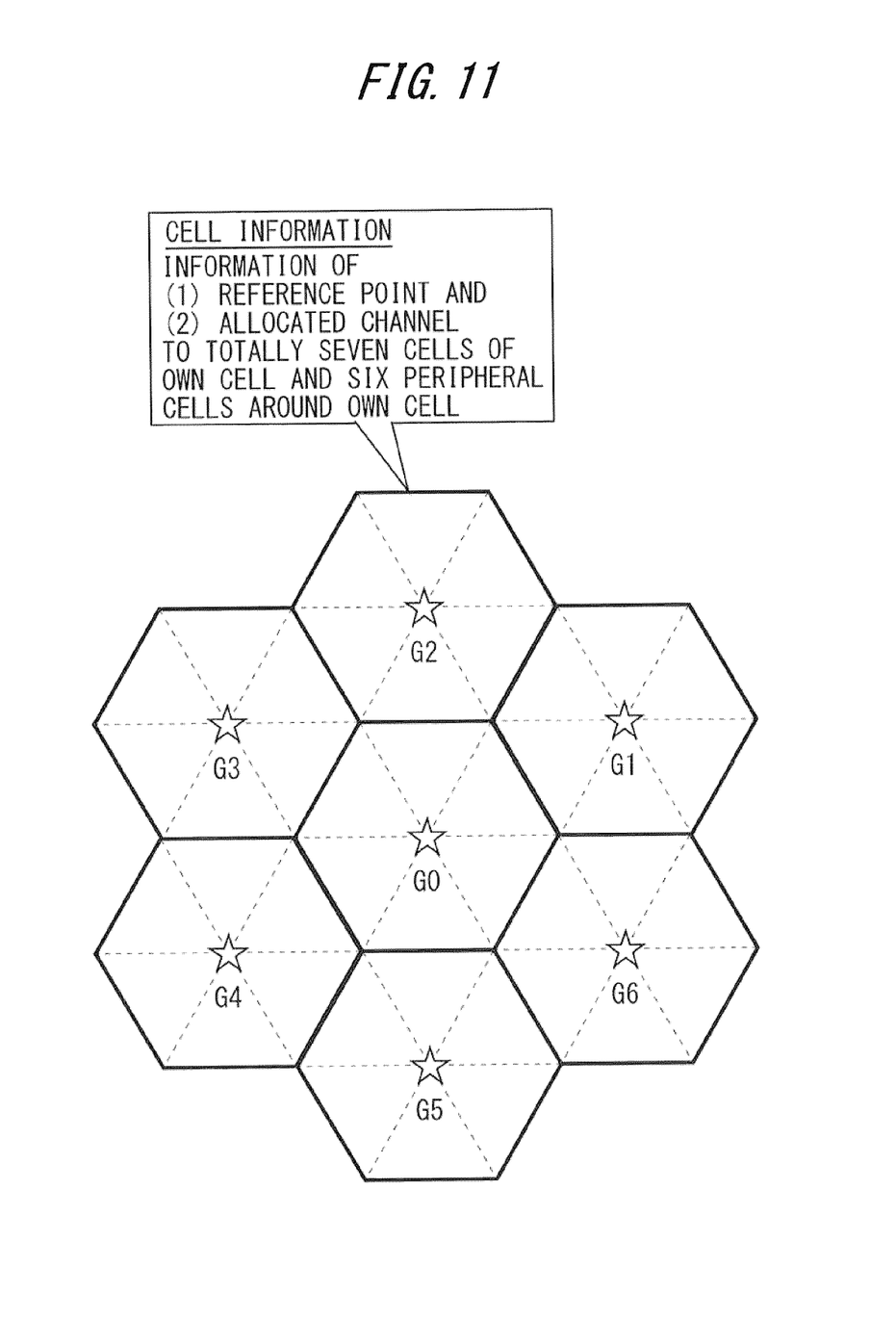
FIG. 11 is a diagram illustrating an example of seven cells included in cell information according to the embodiment.

(5) Updating of Cell Information:

When the cell information described in the processing (4) is held in a status of notification time, the information including the own cell G0 and the six peripheral cells G1 to G6 around the own cell G0 as illustrated in FIG. 11 is not obtained. If the cell information of this status is supplied from the cell information notification unit 6 in response to a cell information request from another terminal, information of a cell to which the terminal originally belongs may not be included. Thus, the received cell information has to be updated into information including the own cell G'0 and the six peripheral cells G'1 to G'6 around the own cell G'0.

Figure 12:
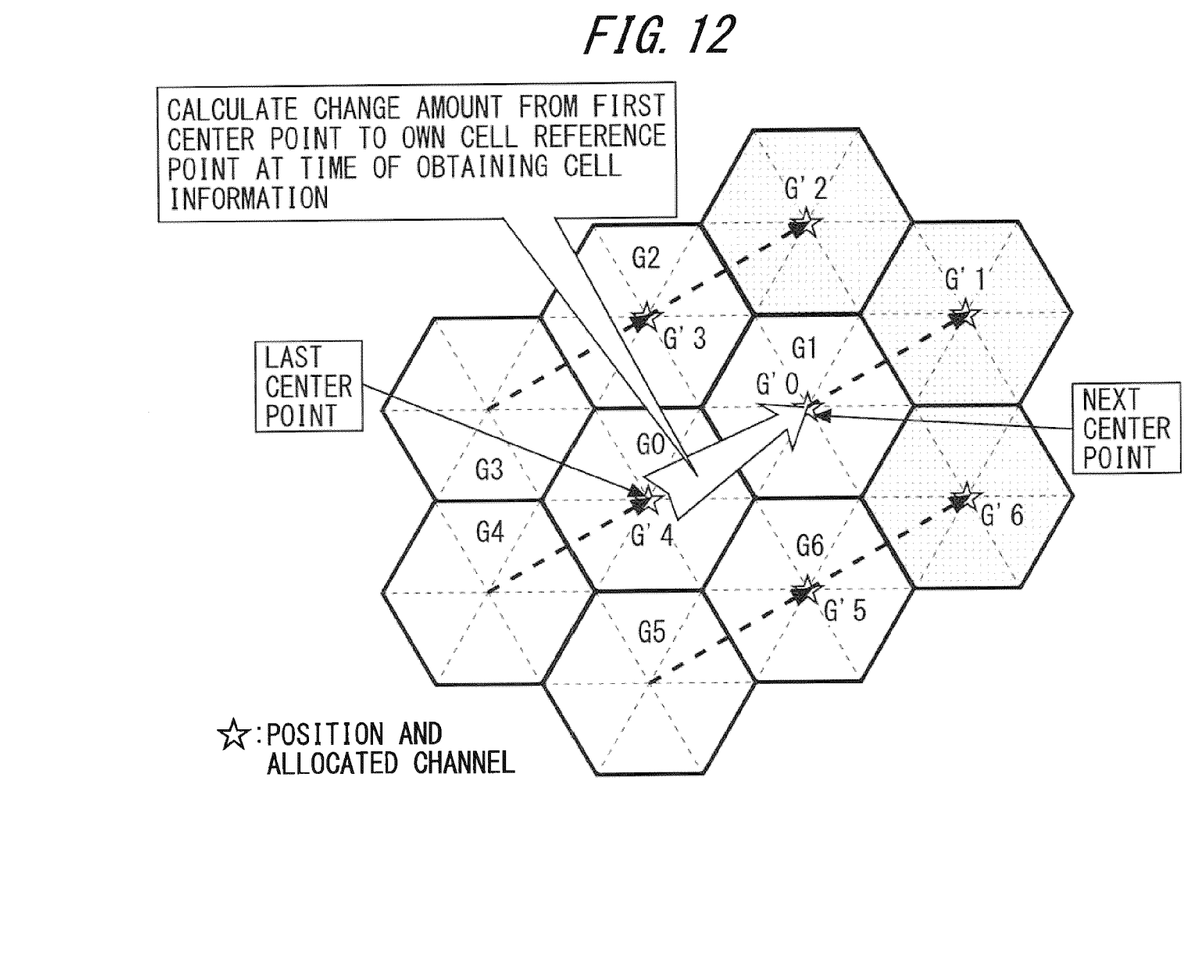
FIG. 12 is a diagram illustrating cell information updating according to the embodiment.

FIG. 6 illustrates a procedure example of cell information updating. First, change amounts Δx and Δy from a reference point (last center point) of an original center cell to a reference point (next center point) of the own cell are calculated (60). By using the calculated change amounts, the reference points of the seven cells are shifted (61). FIG. 12 illustrates an image of such reference point updating.

Then, allocated channel updating is carried out. First, allocated channels are recognized as channel groups, and group numbers are set as illustrated in the table of FIG. 6. In this case, a difference Δg between a channel group number G0 of a last center cell and a channel group number G'0 of a cell to which a terminal currently belongs is calculated (62). By using this difference, calculation similar to that in Step 63 is executed to decide allocated channel group numbers G'1 to G'6 of each cell. Lastly, the cell information thus updated (reference point and allocated channel) is stored as new cell information in the cell information storage unit 8 of the own terminal (64).

In other words, the cell information obtained by the cell information obtaining unit 7 and temporarily stored in the cell information storage unit 8 is read by the cell information updating unit 12, updated by the procedure described above, and then stored again in the cell information storage unit 8. When a cell information request is received from another terminal, the updated cell information is supplied.

The calculation in Step 63 is G'n=Gn+Δg (mod3), and specifically as follows. In this case, mod3 means a modulo 3, and a remainder after division by 3 is obtained.

$G0=1(Ach,Bch)$ $In\ G'0=2(Cch,Ach)$ $\Delta g=2-1=1$ $G'1=G1(2)+1=3(Bch,Cch)$ $G'2=G2(3)+1=4mod3=1(Ach,Bch)$ $G'3=G3(2)+1=3(Bch,Cch)$ $G'4=G4(3)+1=4mod3=1(Ach,Bch)$ $G'5=G5(2)+1=3(Bch,Cch)$ $G'6=G6(3)+1=4mod3=1(Ach,Bch)$

[Effects]

According to the disclosed wireless ad hoc communication terminal, the wireless ad hoc communication can be carried out while increasing a channel capacity as much as that in the case of conventional mobile communication by using the at least two wireless interfaces, without any complex processing dependent on an upper routing method such as switching of a used channel while investigating a next transfer destination.

According to the disclosed wireless ad hoc communication terminal, channels can autonomously be allocated without holding a great deal of cell or channel arrangement information.

MODIFIED EXAMPLE

Figure 13:
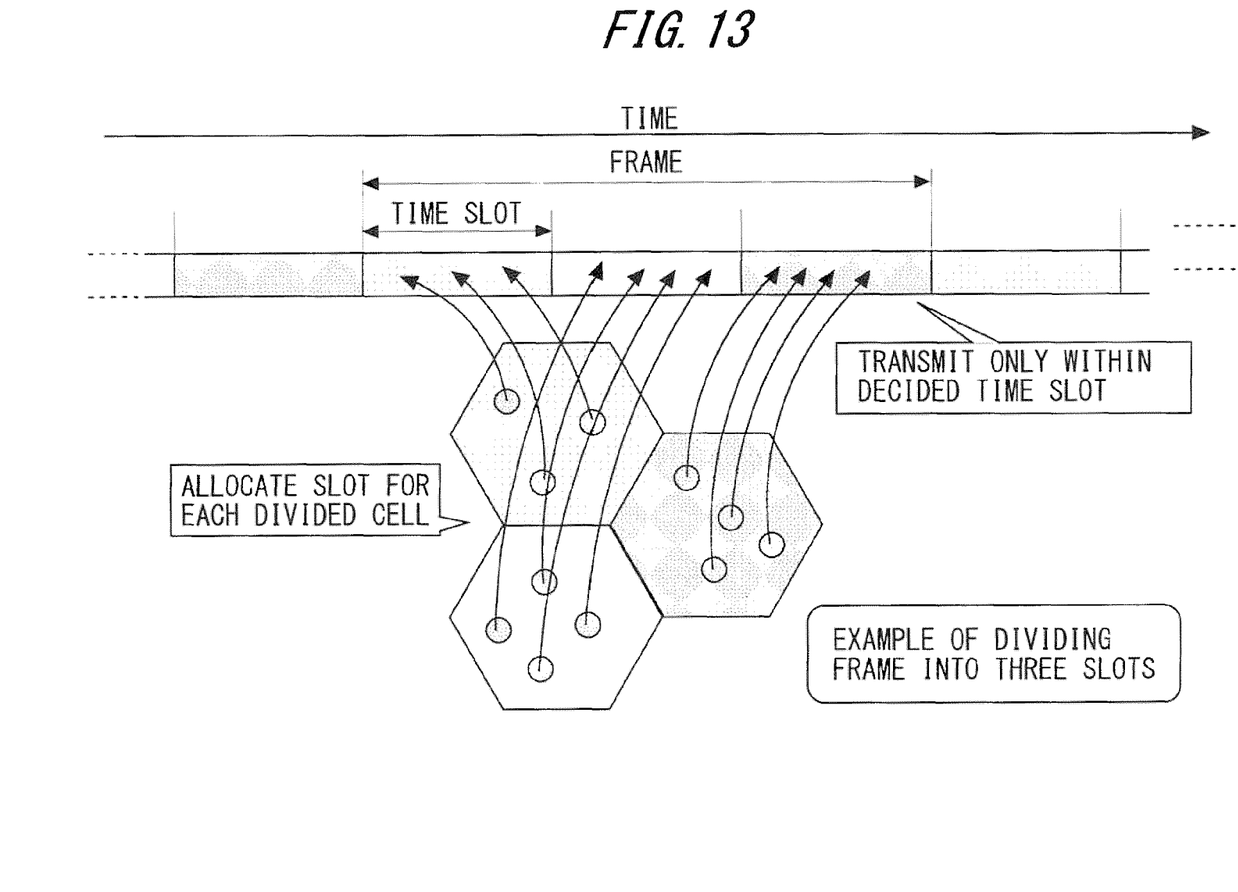
FIG. 13 is a diagram illustrating a modified example.

The wireless terminal MS constituting the wireless ad hoc communication system of the embodiment described above has been described by way of use of a plurality of radio frequency channels. However, as illustrated in FIG. 13, it can be easily understood by those skilled in the art that the invention can be implemented by using a plurality of radio time channels instead.

The conventional art has a fundamental problem that many terminals simultaneously use the same channel. To prevent signal collisions, the number of terminals that simultaneously participate in communication (in the case of wireless LAN, access by carrier sense multiple access with collision avoidance (CSMA/CA)) only has to be reduced. Thus, for example, by setting a frame in a time axis direction, dividing this frame into a plurality of time slots, and transmitting data in an allocated slot by each terminal, the number of terminals simultaneously participating in communication at a certain time slot can be reduced.

In this case, frame/slot timing synchronization is necessary between terminals. However, in the case of a terminal equipped with a GPS, timing synchronization can be realized by obtaining a reference signal from the GPS.

When a wireless LAN is a main target, for example, a section of [t0, t1] may be allocated to terminals A, B, and C, a section of [t1, t2] may be allocated to terminals D, E, and F, a section of [t2, t3] may be allocated to terminals G, H, and I, and normal CSMA/CA operation may be performed in each section.

In the case of ad hoc communication, there is no base station which manages an allocated channel of each terminal and allocates a channel. Thus, similarly, an allocated channel is decided based on a position of a terminal, and a method of propagating allocation information by relaying between terminals can be used.

[Other Respects]

The processing of the embodiment described above is provided as a computer-executable program, and can be provided by a recording medium such as a CD-ROM or a flexible disk or via a communication line.

An arbitrary plurality of or all the processes of the embodiment described above can be selected and combined to be carried out.

What is claimed is:

1. A wireless ad hoc communication terminal that includes two wireless interfaces and performs wireless ad hoc communication with another terminal via the two wireless interfaces, comprising:

a defining unit that defines a communication area to be divided into cells of first polygonal shapes and each of the cells to be divided into a plurality of sub-cells of second polygonal shapes different from the first polygonal shapes;

a first allocating unit that in each of the cells allocates, so as to prevent adjacent cells from belonging to a set of two identical wireless channels, to a cell, two wireless channels among three interference-free wireless channels as the two wireless channels for setting to the two wireless interfaces of the wireless ad hoc communication terminal when the wireless ad hoc communication terminal is present in the cell;

a setting unit that sets, from between the two wireless channels allocated to the cell where the wireless ad hoc communication terminal is present, a wireless channel being identical to either of the two wireless channels that are allocated to another cell being adjacent to one of the sub-cells in the cell where the wireless ad hoc communication terminal is present, to a transmission channel for the wireless ad hoc communication terminal; and a second allocating unit that sets, based on both reference point information and allocated channel information of the cell where the wireless ad hoc communication terminal is present, used channels of a first wireless interface and a second wireless interface as the two wireless interfaces to be a first wireless channel and a second wireless channel as the two wireless channels, that converts terminal position information of the wireless ad hoc communication terminal into circular polar coordinate information where a reference point is a pole and a first direction axis passing through the reference point is an initial line and which contains a distance from the reference point and an angle from the first direction axis, and that allocates, according to a judgment result of a terminal position based on the circular polar coordinate information, transmission channels to the wireless ad hoc communication terminal in maintaining a condition of that the first wireless channel and the second wireless channel are alternately arranged to adjacent sub-cells.

2. The wireless ad hoc communication terminal according to claim 1, further comprising a storage unit that stores cell information, wherein the cell information contains information of the cell and a plurality of peripheral adjacent cells around the cell, and correspondence is set between the reference point information and the allocated channel information for each cell; and the allocated channel information contains the first wireless channel, the second wireless channel, and a channel group number.

3. The wireless ad hoc communication terminal according to claim 2, further comprising an updating unit that updates the cell information by broadcasting, when the wireless ad hoc communication terminal that being a channel-unset terminal obtains the cell information from the another terminal that being a channel-set terminal, a cell information request signal, that selects the reference point information of the cell based on the cell information supplied from the another terminal and the terminal position information stored in the wireless ad hoc communication terminal, and that executes, based on the selected reference point information, allocation processing of the transmission channels.

4. The wireless ad hoc communication terminal according to claim 3, wherein the updating unit calculates a change amount from a reference point of an original center cell to a reference point of a cell where the wireless ad hoc communication terminal is currently present, shifts reference points of the plurality of peripheral adjacent cells based on the calculated change amount, calculates a difference $\Delta g$ between a channel group number G0 of the original center cell and a channel group number G'0 of a cell where the wireless ad hoc communication terminal is currently present, and executes calculation of $G'n=Gn+\Delta g(mod \cdot X)$ to decide a new channel group number G'n of allocated channels of the plurality of peripheral adjacent cells, wherein X denotes a number of channel groups and Gn denotes an original channel group number of the allocated channels of the plurality of peripheral adjacent cells.

5. A method executed by a wireless ad hoc communication terminal that includes two wireless interfaces and performs wireless ad hoc communication with another terminal via the two wireless interfaces, comprising:

defining a communication area to be divided into cells of first polygonal shapes and each of the cells to be divided into a plurality of sub-cells of second polygonal shapes different from the first polygonal shapes;

allocating in each of the cells, so as to prevent adjacent cells from belonging to a set of two identical wireless channels, to a cell, two wireless channels among three interference-free wireless channels as the two wireless channels for setting to the two wireless interfaces of the wireless ad hoc communication terminal when the wireless ad hoc communication terminal is present in the cell;

setting, from between the two wireless channels allocated to the cell where the wireless ad hoc communication terminal is present, a wireless channel being identical to either of the two wireless channels that are allocated to another cell being adjacent to one of the sub-cells in the cell where the wireless ad hoc communication terminal is present, to a transmission channel for the wireless ad hoc communication terminal; and setting, based on both reference point information and allocated channel information of the cell where the wireless ad hoc communication terminal is present, used channels of a first wireless interface and a second wireless interface as the two wireless interfaces to be a first wireless channel and a second wireless channel as the two wireless channels, converting terminal position information of the wireless ad hoc communication terminal into circular polar coordinate information where a reference point is a pole and a first direction axis passing through the reference point is an initial line and which contains a distance from the reference point and an angle from the first direction axis, and allocating, according to a judgment result of a terminal position based on the circular polar coordinate information, transmission channels to the wireless ad hoc communication terminal in maintaining a condition of that the first wireless channel and the second wireless channel are alternately arranged to adjacent sub-cells.

6. A non-transitory computer readable recording medium storing a computer program to be executed by a wireless ad hoc communication terminal that includes two wireless interfaces and performs wireless ad hoc communication with another terminal via the two wireless interfaces, the program executing:

defining a communication area to be divided into cells of first polygonal shapes and each of the cells to be divided into a plurality of sub-cells of second polygonal shapes different from the first polygonal shapes;

allocating in each of the cells, so as to prevent adjacent cells from belonging to a set of two identical wireless channels, to a cell, two wireless channels among three interference-free wireless channels as the two wireless channels for setting to the two wireless interfaces of the wireless ad hoc communication terminal when the wireless ad hoc communication terminal is present in the cell;

setting, from between the two wireless channels allocated to the cell where the wireless ad hoc communication terminal is present, a wireless channel being identical to either of the two wireless channels that are allocated to another cell being adjacent to one of the sub-cells in the cell where the wireless ad hoc communication terminal is present, to a transmission channel for the wireless ad hoc communication terminal; and setting, based on both reference point information and allocated channel information of the cell where the wireless ad hoc communication terminal is present, used channels of a first wireless interface and a second wireless interface as the two wireless interfaces to be a first wireless channel and a second wireless channel as the two wireless channels, converting terminal position information of the wireless ad hoc communication terminal into circular polar coordinate information where a reference point is a pole and a first direction axis passing through the reference point is an initial line and which contains a distance from the reference point and an angle from the first direction axis, and allocating, according to a judgment result of a terminal position based on the circular polar coordinate information, transmission channels to the wireless ad hoc communication terminal in maintaining a condition of that the first wireless channel and the second wireless channel are alternately arranged to adjacent sub-cells.

* * * * *